United States Patent
Cheng et al.

(10) Patent No.: US 12,107,725 B2
(45) Date of Patent: Oct. 1, 2024

(54) METHOD AND APPARATUS FOR REMOTE CUSTOMIZATION OF FUNCTION, DEVICE, AND STORAGE MEDIUM

(71) Applicant: ZTE CORPORATION, Shenzhen (CN)

(72) Inventors: Fei Cheng, Shenzhen (CN); Hui Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 39 days.

(21) Appl. No.: 17/923,816

(22) PCT Filed: Mar. 16, 2021

(86) PCT No.: PCT/CN2021/081047
§ 371 (c)(1),
(2) Date: Nov. 7, 2022

(87) PCT Pub. No.: WO2021/232909
PCT Pub. Date: Nov. 25, 2021

(65) Prior Publication Data
US 2023/0179480 A1 Jun. 8, 2023

(30) Foreign Application Priority Data
May 21, 2020 (CN) .......................... 202010436977.3

(51) Int. Cl.
G06F 15/177 (2006.01)
H04L 41/082 (2022.01)
H04L 67/00 (2022.01)

(52) U.S. Cl.
CPC ............ *H04L 41/082* (2013.01); *H04L 67/34* (2013.01)

(58) Field of Classification Search
CPC .............................. H04L 41/082; H04L 67/34
See application file for complete search history.

(56) References Cited

U.S. PATENT DOCUMENTS

| 2007/0063860 A1 | 3/2007 | Escobosa et al. |
| 2011/0072359 A1 | 3/2011 | So et al. |
| 2020/0007418 A1 | 1/2020 | Greenstein et al. |

FOREIGN PATENT DOCUMENTS

| CN | 102576283 A | 7/2012 |
| CN | 108121563 A | 6/2018 |
| CN | 112181407 A | 1/2021 |

OTHER PUBLICATIONS

International Search Report in Application No. PCT/CN2021/081047, filed Mar. 16, 2021, 4 pages, including English translation.
Extended European Search Report in Application No. 21807620.6, dated Jun. 10, 2024, 10 pages.
Bhatia, S. et al.: "Remote Customization of Systems Code for Embedded Devices", EMSOFT 1 04, Sep. 29, 2004 (Sep. 29, 2004), pp. 7-15.

*Primary Examiner* — Joseph R Maniwang
(74) *Attorney, Agent, or Firm* — Morgan, Lewis & Bockius LLP

(57) ABSTRACT

Provided are a method and apparatus for remote customization of a function, a device, and a storage medium. The method includes: determining a custom function according to a service requirement and dividing the custom function into at least one minimum function unit; determining a remote function operation instruction for the minimum function unit; and sending the remote function operation instruction to a device terminal to cause the device terminal to implement the custom function.

13 Claims, 7 Drawing Sheets

METHOD AND APPARATUS FOR REMOTE CUSTOMIZATION OF FUNCTION, DEVICE, AND STORAGE MEDIUM

CROSS REFERENCE TO RELATED APPLICATIONS

This is a National Stage Application, filed under 35 U.S.C. 371, of International Patent Application No. PCT/CN2021/081047, filed on Mar. 16, 2021, which is based on claims priority to Chinese Patent Application No. 202010436977.3 filed with the China National Intellectual Property Administration (CNIPA) on May 21, 2020, the disclosure of which is incorporated herein by reference in its entirety.

TECHNICAL FIELD

The present application relates to the field of wireless communication, for example, a method and apparatus for remote customization of a function, a device, and a storage medium.

BACKGROUND

With the development of 5G technology, the Internet of everything is possible to implement and more and more devices are connected through a network. In this case, a terminal device is managed based on a remote server in increasingly wide scenarios. The terminal device is connected to the remote server through a negotiated connection protocol, and service functions, such as service startup, function setting, file upload and download, and device diagnosis, are implemented through data interaction between the terminal device and the remote server.

With the development of the Internet of everything, the functions of terminal devices often need to be adjusted according to service requirements and market development. In the related art, a new version of software is developed according to a requirement and the terminal device is upgraded based on the new version of software. Thus, a function change of the terminal device requires a relatively large overhead.

SUMMARY

The following is a summary of the subject matter described herein in detail. The summary is not intended to limit the scope of the claims.

Embodiments of the present application provide a method and apparatus for remote customization of a function, a device, and a storage medium, so as to implement the remote function customization for a device terminal, reduce the development cost of a function upgrade of the device terminal, and improve service function upgrade efficiency.

An embodiment of the present application provides a method for remote customization of a function, which is applied to a remote server. The method includes the following.

A custom function is determined according to a service requirement and the custom function is divided into at least one minimum function unit. A remote function operation instruction is determined for the minimum function unit. The remote function operation instruction is sent to a device terminal to cause the device terminal to implement the custom function.

An embodiment of the present application provides a method for remote customization of a function, which is applied to a terminal device. The method includes the following.

A remote function operation instruction sent by a remote server is received. Basic functions are acquired from a pre-stored set of minimum function units according to the remote function operation instruction. A custom function is constructed according to the basic functions.

An embodiment of the present application provides an apparatus for remote customization of a function applied to a remote server. The apparatus includes a function division module, an instruction determination module, and an instruction transmission module.

The function division module is configured to determine a custom function according to a service requirement and divide the custom function into at least one minimum function unit. The instruction determination module is configured to determine a remote function operation instruction for the minimum function unit. The instruction transmission module is configured to send the remote function operation instruction to a device terminal to cause the device terminal to implement the custom function.

An embodiment of the present application provides an apparatus for remote customization of a function applied to a terminal device. The apparatus includes an instruction receiving module, a function seeking module, and a function construction module.

The instruction receiving module is configured to receive a remote function operation instruction sent by a remote server. The function seeking module is configured to acquire basic functions from a pre-stored set of minimum function units according to the remote function operation instruction. The function construction module is configured to construct a custom function according to the basic functions.

An embodiment of the present application provides a device including one or more processors and a memory.

The memory is configured to store one or more programs.

The one or more programs are executed by the one or more processors to cause the one or more processors to perform the method for remote customization of a function in any one of embodiments of the present application.

An embodiment of the present application provides a computer-readable storage medium, which is configured to store a computer program, where the computer program, when executed by a processor, causes the processor to perform the method for remote customization of a function in any one of embodiments of the present application.

In the embodiments of the present application, the custom function corresponding to the service requirement is determined and divided into the at least one minimum function unit, and the remote function operation instruction corresponding to the minimum function unit is determined and sent to the terminal device so that the terminal device implements the custom function, improving the upgrade efficiency of the terminal device and reducing the function change overhead of the terminal device.

The preceding embodiments and other aspects of the present application and implementations thereof are described in more detail in the brief description of drawings, detailed description, and claims.

Other aspects can be understood after the drawings and the detailed description are read and understood.

DETAILED DESCRIPTION

Embodiments of the present application are described hereinafter in detail in conjunction with drawings. It is to be noted that if not in collision, embodiments of the present application and features therein may be combined with each other in any manner.

When terminal devices require custom functions, the following steps need to be performed: a manufacturer proposes requirements; the requirements are decomposed and mapped to service functions; the service functions corresponding to the terminal devices are developed; a new software version is constructed according to the service functions; the new software version and its upgrade package are released; and all the terminal devices are upgraded using the upgrade package. However, in the related art, no matter whether the custom functions are complex, the software version of the terminal devices needs to be updated according to the preceding steps, the terminal devices are upgraded within a very long period, and multiple links such as operators, development, and testing are required to participate, resulting in a relatively high labor cost. Moreover, due to many links involved in a long upgrade period, the terminal devices fail to be upgraded at a higher risk, reducing reliability. In embodiments of the present application, remote function customization is implemented by a remote server in cooperation with a terminal device, reducing the function change overhead of the terminal device and improving the upgrade efficiency of the terminal device.

Figure 1:
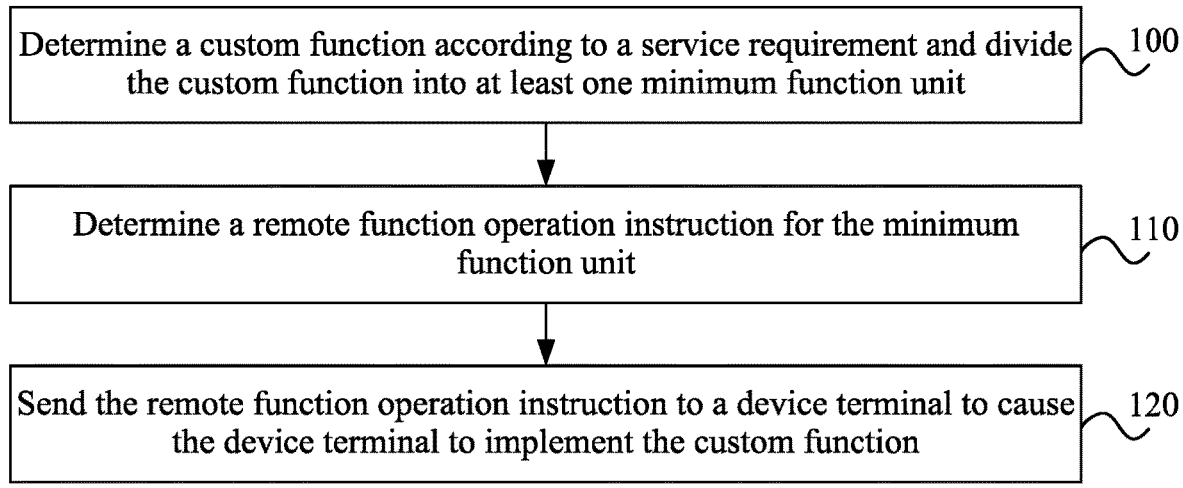
FIG. 1 is a flowchart of a method for remote customization of a function according to an embodiment of the present application.

FIG. 1 is a flowchart of a method for remote customization of a function according to an embodiment of the present application. The embodiment of the present application is applicable to the case of a function change of a terminal device. The method may be performed by an apparatus for remote customization of a function in an embodiment of the present application, where the apparatus may be implemented by software and/or hardware and is generally integrated in a remote server. The method in the embodiment of the present application includes the followings described below.

In 100, a custom function is determined according to a service requirement and the custom function is divided into at least one minimum function unit.

The service requirement is a requirement proposed by a user of the terminal device for adding or reducing a function based on original functions of the terminal device, for example, adding a text messaging function to the terminal device. The service requirement may be determined automatically or manually. The custom function is a function for fulfilling the service requirement. The custom function may include a service function of the terminal device, a platform function of a device terminal, a data processing function for terminal data, and the like. The minimum function unit is a minimum unit constituting the custom function. Each minimum function unit performs a single function, such as page opening, information sending, and information processing. The minimum function unit cannot be further divided. For example, a page opening function cannot be composed of smaller functions and thus the function may be the minimum function unit. The custom function is a complex function capable of implementing multiple operations, and each operation in the custom function may be the minimum function unit.

In an example embodiment, the service requirement of an operator is acquired, a table of custom functions is searched for the corresponding custom function according to the service requirement, and the custom function is divided into multiple minimum function units according to operation steps included in the custom function.

In another example embodiment, the service requirement of an operator may be inputted into a neural network model so that the matched custom function is acquired. The custom function may be an execution statement or pseudocode composed of operation steps and is further divided into minimum function units based on the operation steps of the custom function.

In 110, a remote function operation instruction is determined for the minimum function unit.

The remote function operation instruction includes operation information for calling a basic function of the device terminal. Different remote function operation instructions correspond to different basic functions. The remote function operation instruction may be identification information uniquely corresponding to the basic function of the device terminal. The remote server sends the remote function operation instruction to the terminal device, so as to call the basic function corresponding to the remote function operation instruction.

In the embodiment of the present application, different minimum function units are implemented by different basic functions of the terminal device, and the remote function operation instruction for calling the terminal device is determined through the minimum function unit. For example, according to an identification number of the minimum function unit, the remote function operation instruction stored in association with the identification number may be searched for. It is to be understood that the custom function is composed of multiple minimum function units and to implement the custom function, multiple remote function operation instructions are required, which correspond to different basic functions of the device terminal.

In 120, the remote function operation instruction is sent to the device terminal to cause the device terminal to implement the custom function.

In an example embodiment, the server sends the remote function operation instruction to the device terminal, and the device terminal calls the basic function according to the remote function operation instruction to implement the corresponding minimum function unit and implement the custom function. In the embodiment of the present application, each remote server has multiple connection channels with the device terminal and may send different remote function operation instructions through different connection channels, and the device terminal considers that the corresponding remote function operation instructions are acquired in response to receiving information through the corresponding connection channels and the terminal device implements the custom function according to the corresponding remote function operation instructions.

In the embodiment of the present application, the custom function corresponding to the service requirement is determined and divided into the at least one minimum function unit, and the remote function operation instruction corresponding to the minimum function unit is determined and sent to the device terminal so that the remote customization performed by the remote server for the device terminal is implemented, improving the function update efficiency of the device terminal and reducing the software upgrade overhead of the device terminal.

Figure 2:
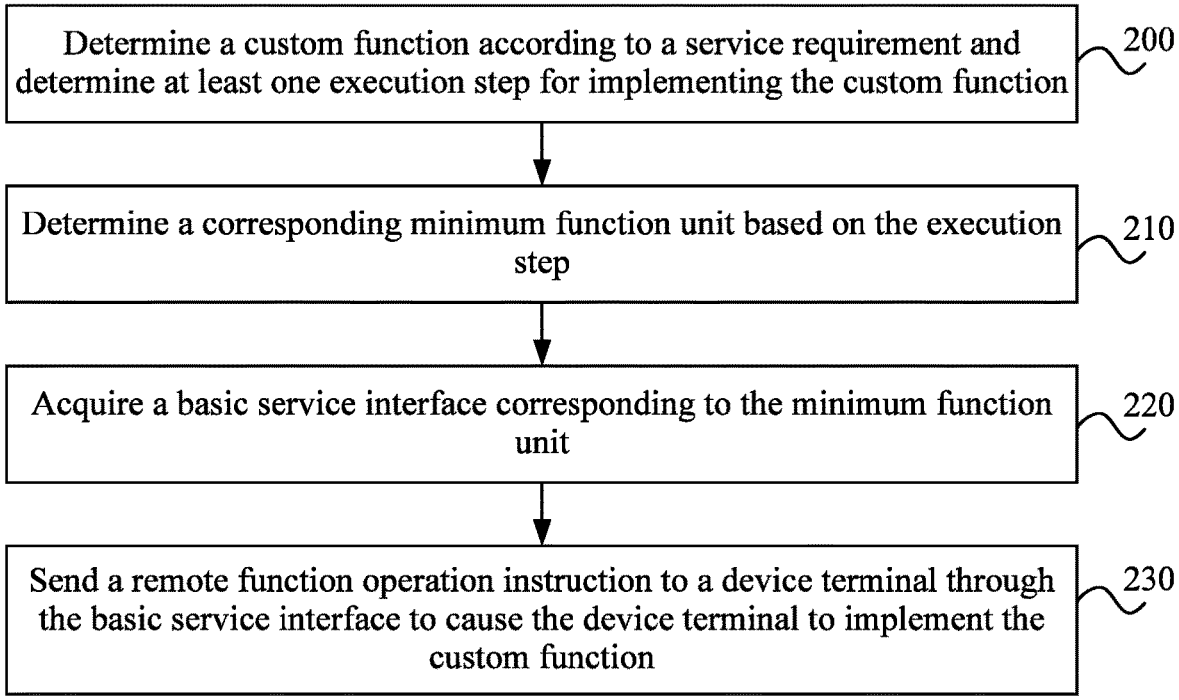
FIG. 2 is a flowchart of another method for remote customization of a function according to an embodiment of the present application.

FIG. 2 is a flowchart of another method for remote customization of the function according to an embodiment of the present application. The embodiment of the present application is embodied based on the preceding embodiment, where a custom function is divided into minimum function units through execution steps and a remote function operation instruction is sent through a service interface. Referring to FIG. 2, the method for remote customization of the function provided in the embodiment of the present application includes the following.

In 200, the custom function is determined according to a service requirement and at least one execution step for implementing the custom function is determined.

A service function corresponding to the custom function is composed of multiple execution steps, and each execution step implements only one basic function of the custom function, for example, information sending or page opening. The execution steps constitute the custom function and are in a sequence according to the corresponding custom function.

In an example embodiment, the service requirement of a device terminal of an operator is acquired, the corresponding custom function is determined according to the service requirement, the custom function may be stored in association with the execution steps, and the corresponding execution steps are drawn based on the custom function. It is to be understood that the custom function may correspond to multiple execution steps which are in a sequence, and the custom function may be implemented by the multiple execution steps performed in sequence.

In 210, a corresponding minimum function unit is determined based on the execution step.

In the embodiment of the present application, each execution step corresponds to one minimum function unit, and the minimum function unit corresponding to the execution step may be searched for according to a unique identification number of the execution step.

In 220, a basic service interface corresponding to the minimum function unit is acquired.

The basic service interface may be a connection interface for information interaction between a remote server and the device terminal, and different minimum function units may be called by information transmitted through different basic service interfaces.

In an example embodiment, the minimum function unit is stored in association with the basic service interface and the corresponding basic service interface may be searched for through the minimum function unit.

In 230, the remote function operation instruction is sent to the device terminal through the basic service interface to cause the device terminal to implement the custom function.

In the embodiment of the present application, the remote function operation instruction is sent to the device terminal through the basic service interface, and different remote operation instructions are sent through basic service interfaces for the corresponding minimum function units.

Figure 3:
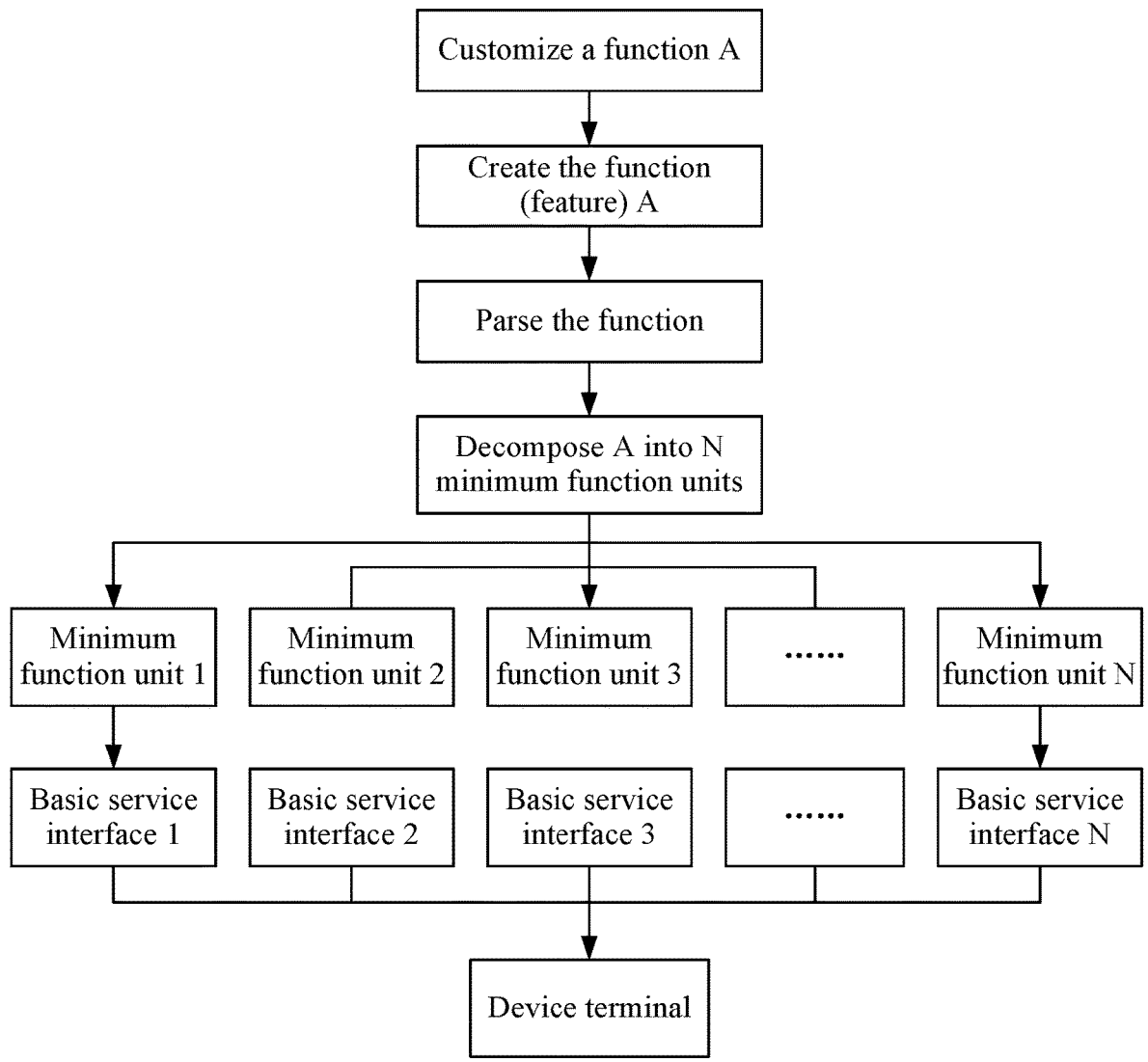
FIG. 3 is a diagram illustrating an example of a method for remote customization of a function according to an embodiment of the present application.

For example, FIG. 3 is a diagram illustrating an example of a method for remote customization of a function according to an embodiment of the present application. The method is applied to a server side and includes the following. In 1, the operator needs to customize a function A which is dynamically and remotely customized by the server. In 2, a dynamic customization module on the server side creates the function (feature) A, parses the custom function A, and decomposes the function A into N minimum function units. In 3, the server side calls N basic service interfaces of a terminal device in sequence, where each basic service interface corresponds to one minimum function unit in 2. In 4, the remote server interacts with the device terminal and receives remote operation instructions. As shown in FIG. 3, an instruction for the function A is received, which includes N remote operation instructions.

In the embodiment of the present application, the custom function is determined according to the service requirement, the at least one execution step of the custom function is determined, a minimum function unit corresponding to the at least one execution step is determined based on the execution step, the basic service interface is acquired, and the remote function operation instruction for the minimum function unit is sent to the device terminal through the basic service interface so that the remote function customization performed by the remote server for the device terminal is implemented, reducing the function change overhead of the device terminal and improving the software upgrade efficiency of the terminal device.

For example, based on the preceding embodiments of the present application, the remote function operation instruction includes a calling instruction for the at least one minimum function unit.

In an example embodiment, the remote function operation instruction is a calling instruction set, and calling instructions in the remote function operation instruction correspond to respective minimum function units, and different minimum function units may correspond to different calling instructions.

Figure 4:
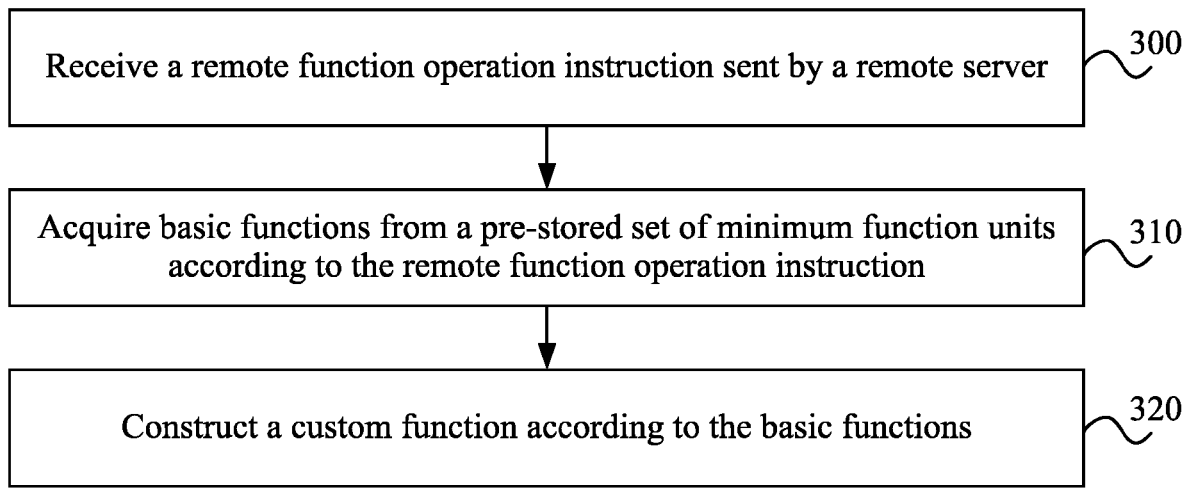
FIG. 4 is a flowchart of another method for remote customization of a function according to an embodiment of the present application.

FIG. 4 is a flowchart of another method for remote customization of a function according to an embodiment of the present application. The embodiment of the present application is applicable to the case of a function change of a terminal device. The method may be performed by an apparatus for remote customization of a function in an embodiment of the present application, where the apparatus may be implemented by software and/or hardware and is generally integrated in a device terminal. The method in the embodiment of the present application includes the followings described below.

In 300, a remote function operation instruction sent by a remote server is received.

In an embodiment, the device terminal receives, through function calling interfaces, the remote function operation instruction sent by the remote server, where the remote function operation instruction may include calling information for one or more basic functions. For example, the remote function operation instruction is a unique identification number of a basic function of the device terminal.

In 310, the basic functions are acquired from a pre-stored set of minimum function units according to the remote function operation instruction.

The set of minimum function units is a pre-stored set of programs for the basic functions, which may be application programming interfaces (APIs) for different basic functions of the device terminal. Basic functions in the set of minimum function units may not be repeated, and each basic function appears once and appears only once. The basic functions are minimum functions supported by the device terminal, such as opening a text message interface, setting a number in a text message center, editing text message protocol data unit (PDU) codes, and sending a text message.

In the embodiment of the present application, the set of minimum function units is pre-stored, the remote function operation instruction may be stored in association with a basic function in the set of minimum function units, and the device terminal may query the corresponding basic function from the set of minimum function units according to the received remote function operation instruction. For example, the set of minimum function units includes at least one of the following basic functions: a minimum service function unit, a minimum platform function unit, or a minimum data processing function unit.

In the embodiment of the present application, the basic functions stored in the set of minimum function units may be divided into the minimum service function unit, the minimum platform function unit, and the minimum data processing function unit according to different processing services. The minimum service function unit is a function for operating on a service of the device terminal, the minimum platform function unit is a function for operating on a platform of the device terminal, and the minimum data processing function unit is a function for operating on data of the device terminal.

In 320, a custom function is constructed according to the basic functions.

In the embodiment of the present application, the device terminal combines and connects the acquired basic functions and constructs the custom function through the cooperation between different basic functions. In the embodiment of the present application, the remote function operation instruction sent by the remote server is acquired, the basic functions are acquired from a pre-stored remote function set based on the remote function operation instruction, and the basic functions are connected so as to construct the custom function so that the remote function customization for the device terminal is implemented, reducing the function change overhead of the terminal device and improving the upgrade efficiency of the terminal device.

For example, based on the preceding embodiment of the present application, that the basic functions are sought from the pre-stored set of minimum function units according to the remote function operation instruction includes the following.

A function framework is created based on the remote function operation instruction. The basic functions are acquired from the set of minimum function units in sequence according to an execution sequence of the function framework.

The function framework may be a software framework for implementing the custom function and includes an execution sequence of multiple basic functions in the custom function.

In the embodiment of the present application, when receiving remote function calling instructions, the terminal device forms a large function framework according to multiple remote function calling instructions, where the execution sequence of the function framework may be determined by the remote function calling instructions. The basic functions corresponding to the remote function operation instruction are acquired in sequence according to the execution sequence of the function framework.

For example, based on the preceding embodiment of the present application, that the custom function is constructed according to the basic functions includes the following.

The function framework corresponding to the remote function operation instruction is filled with the basic functions so as to construct the custom function.

In an example embodiment, the device terminal may implement the acquired basic functions in sequence in the function framework by filling the function framework with program codes or calling interfaces corresponding to the basic functions in sequence, thereby constructing the custom function. For example, the function framework filled with the basic functions may be stored as the custom function of the terminal device.

Figure 5:
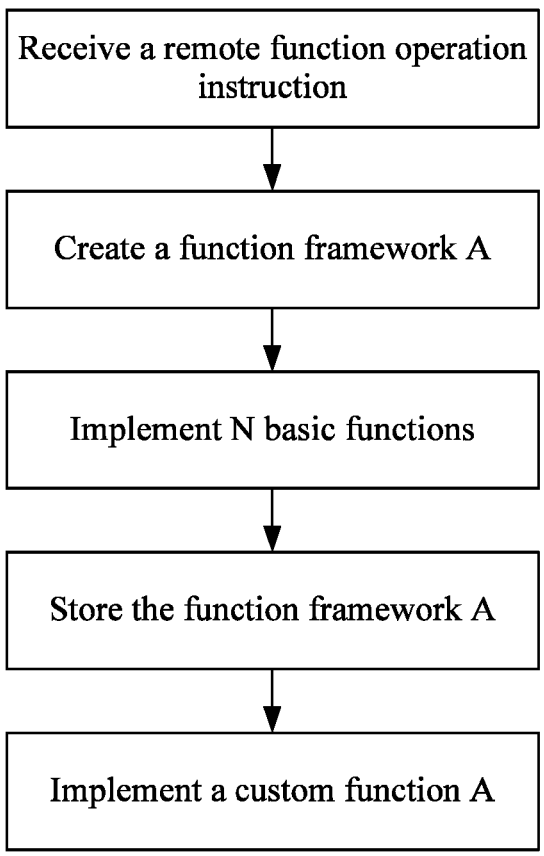
FIG. 5 is a diagram illustrating an example of a method for remote customization of a function according to an embodiment of the present application.

For example, FIG. 5 is a diagram illustrating an example of a method for remote customization of a function according to an embodiment of the present application. Referring to FIG. 5, the device terminal receives the remote function operation instruction which may include N operation instructions. The device terminal creates a new function framework A according to the N operation instructions, where the function framework A corresponds to the remote function operation instruction from the remote server. N basic functions are implemented in sequence as required by the function framework A. The implemented function framework A is stored in the device as a subsequent supported function item. Thus, a custom function A is created.

Figure 6:
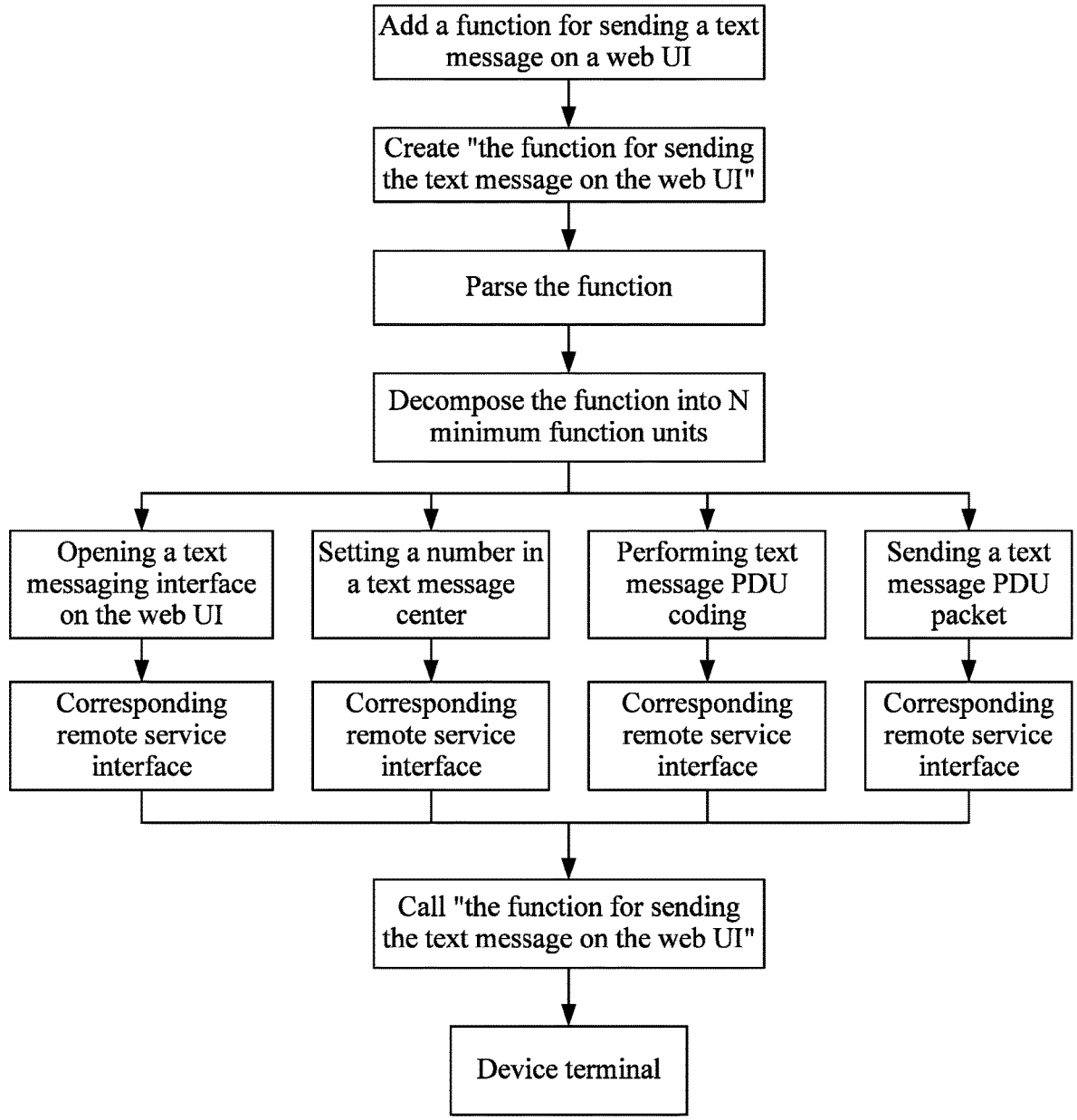
FIG. 6 is a diagram illustrating an example in which a text messaging function is added according to an embodiment of the present application.

In an example embodiment, an example in which a text messaging function is added to a device terminal is used. FIG. 6 is a diagram illustrating an example in which a text messaging function is added according to an embodiment of the present application. Referring to FIG. 6, on a remote server side, in 1, an operator needs to add a function for sending a text message on a website user interface (web UI). In 2, a feature, "the function for sending the text message on the web UI" is created as required by the operator. In 3, "the function for sending the text message on the web UI" is parsed and decomposed into four minimum function units, that is, opening a text messaging interface on the web UI, setting a number in a text message center, performing text message PDU coding, and sending a text message PDU packet through AT. In 4, each of the minimum function units decomposed into corresponds to one remote service interface. In 5, the feature, "the function for sending the text message on the web UI" is called, where the feature includes the following remote calling interfaces of the device terminal: remotely opening the text messaging interface on the web UI, remotely setting the number in the text message center, remotely performing the text message PDU coding, and remotely sending the text message. In 6, the called feature, "the function for sending the text message on the web UI" is sent to the device terminal.

Figure 7:
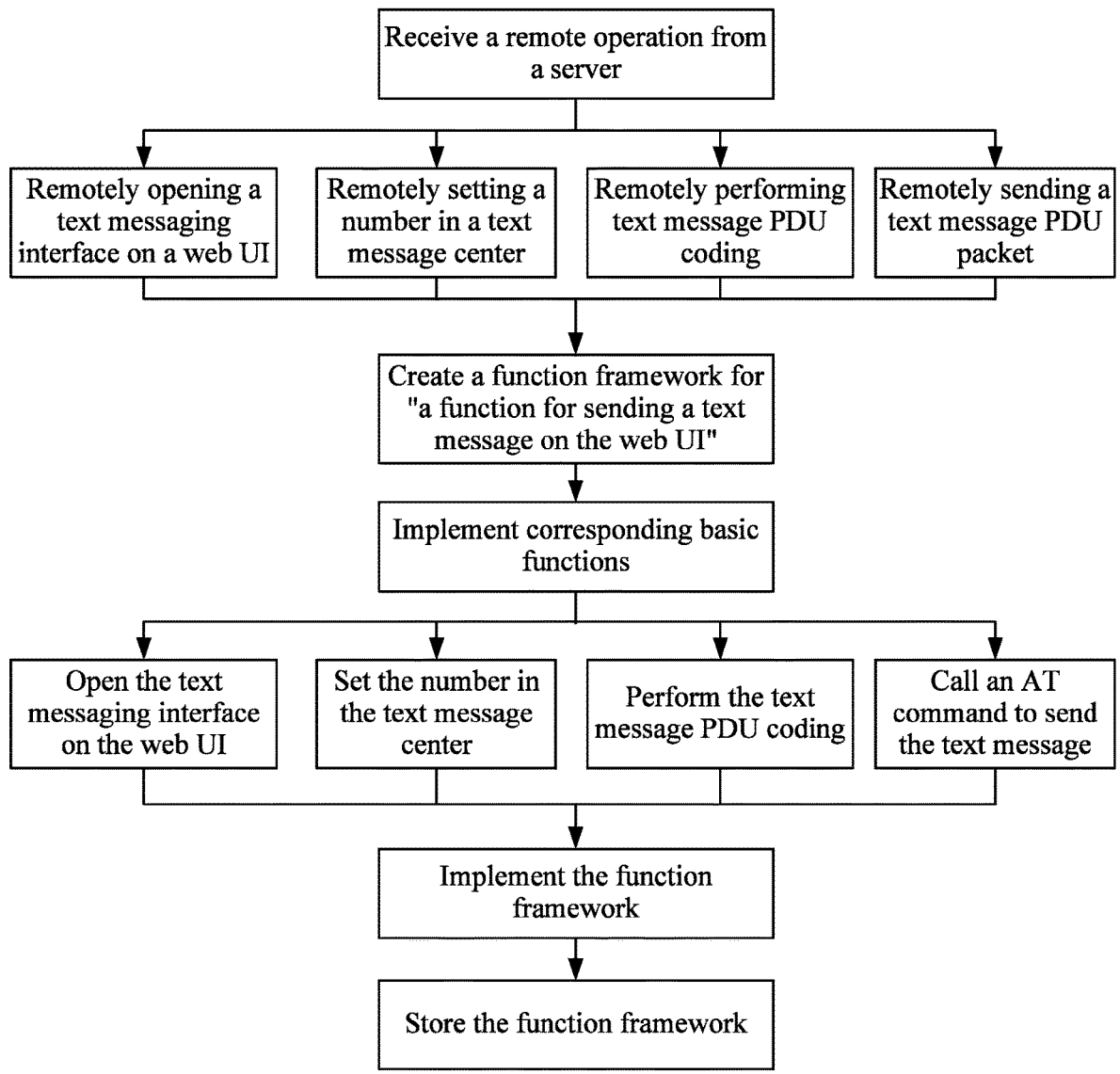
FIG. 7 is a diagram illustrating another example in which a text messaging function is added according to an embodiment of the present application.
Figure 8:
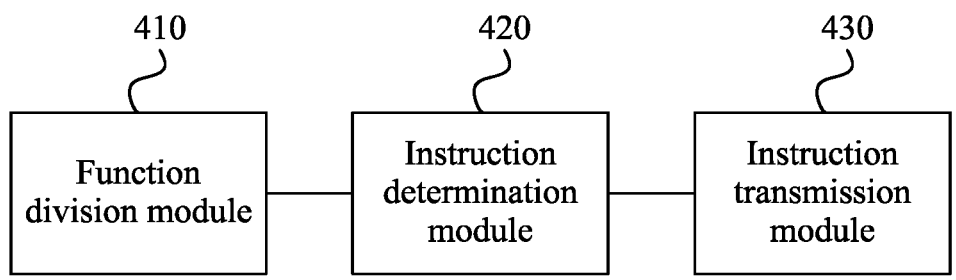
FIG. 8 is a structural diagram of an apparatus for remote customization of a function according to an embodiment of the present application.

In an example embodiment, an example in which a text messaging function is added to a device terminal is used. FIG. 7 is a diagram illustrating another example in which a text messaging function is added according to an embodiment of the present application. Referring to FIG. 7, on a device terminal side, in 1, a remote operation instruction is received from a remote server, which includes remotely opening a text messaging interface on a web UI, remotely setting a number in a text message center, remotely completing text message PDU coding, and remotely calling AT and sending a text message. In 2, the device terminal creates a new function framework which includes four basic functions in 1. In 3, the device terminal executes basic function interfaces in the function framework in sequence to open the text messaging interface on the web UI, set the number in the text message center, perform the text message PDU coding, and call the AT for sending the text message to send a PDU packet, so as to implement a function for sending the text message on the web UI. In 4, the function framework implementing the function is stored so that the function for "sending the text message on the web UI" becomes a supported function of the device terminal. FIG. 8 is a structural diagram of an apparatus for remote customization of a function according to an embodiment of the present application. The apparatus may perform the method for remote customization of a function provided in any embodiment of the present application and has function modules corresponding to the performed method. The apparatus may be implemented by software and/or hardware, is generally integrated in a remote server, and includes a function division module 410, an instruction determination module 420, and an instruction transmission module 430.

The function division module 410 is configured to determine a custom function according to a service requirement and divide the custom function into at least one minimum function unit.

The instruction determination module 420 is configured to determine a remote function operation instruction for the minimum function unit.

The instruction transmission module 430 is configured to send the remote function operation instruction to a device terminal to cause the device terminal to implement the custom function.

In the embodiment of the present application, the function division module determines the custom function corresponding to the service requirement and divide the custom function into the at least one minimum function unit, the instruction determination module determines the remote function operation instruction corresponding to the minimum function unit, and the instruction transmission module sends the remote function operation instruction to the device terminal so that the remote customization performed by the remote server for the device terminal is implemented, improving the function update efficiency of the device terminal and reducing the software upgrade overhead of the device terminal.

For example, based on the preceding embodiment of the present application, the function division module 410 includes a step determination unit and an atom determination unit.

The step determination unit is configured to determine at least one execution step of the custom function.

The atom determination unit is configured to determine a minimum function unit corresponding to the at least one execution step based on the execution step.

For example, based on the preceding embodiment of the present application, the remote function operation instruction in the instruction determination module 420 includes a calling instruction for the at least one minimum function unit.

For example, based on the preceding embodiment of the present application, the instruction transmission module 430 includes an interface acquisition unit and an instruction sending unit.

The interface acquisition unit is configured to acquire a basic service interface corresponding to the minimum function unit.

The instruction sending unit is configured to send the remote function operation instruction to the device terminal through the basic service interface to cause the device terminal to implement the custom function.

Figure 9:
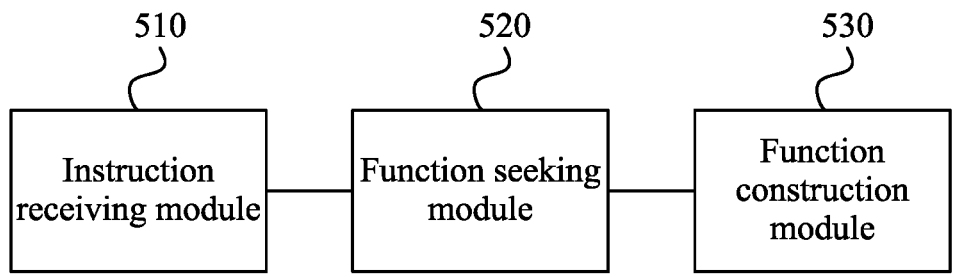
FIG. 9 is a structural diagram of another apparatus for remote customization of a function according to an embodiment of the present application.

FIG. 9 is a structural diagram of another apparatus for remote customization of a function according to an embodiment of the present application. The apparatus may perform the method for remote customization of a function provided in any embodiment of the present application and has function modules corresponding to the performed method. The apparatus may be implemented by software and/or hardware, is generally integrated in a device terminal, and includes an instruction receiving module 510, a function seeking module 520, and a function construction module 530.

The instruction receiving module 510 is configured to receive a remote function operation instruction sent by a remote server.

The function seeking module 520 is configured to acquire basic functions from a pre-stored set of minimum function units according to the remote function operation instruction.

The function construction module 530 is configured to construct a custom function according to the basic functions.

In the embodiment of the present application, the instruction receiving module acquires the remote function operation instruction sent by the remote server, the function seeking module acquires the basic functions from a pre-stored remote function set based on the remote function operation instruction, and the function construction module connects the basic functions to construct the custom function so that the remote function customization for the device terminal is implemented, reducing the function change overhead of a terminal device and improving the upgrade efficiency of the terminal device.

For example, based on the preceding embodiment of the present application, the function seeking module 520 includes a framework creation unit and a basic function unit.

The framework creation unit is configured to create a function framework based on the remote function operation instruction.

The basic function unit is configured to acquire the basic functions from the set of minimum function units in sequence according to an execution sequence of the function framework.

For example, based on the preceding embodiment of the present application, the function construction module 530 includes a function filling unit.

The function filling unit is configured to fill the function framework corresponding to the remote function operation instruction with the basic functions to construct the custom function.

For example, based on the preceding embodiment of the present application, the set of minimum function units in the function seeking module 520 includes at least one of a minimum service function unit, a minimum platform function unit, or a minimum data processing function unit.

Figure 10:
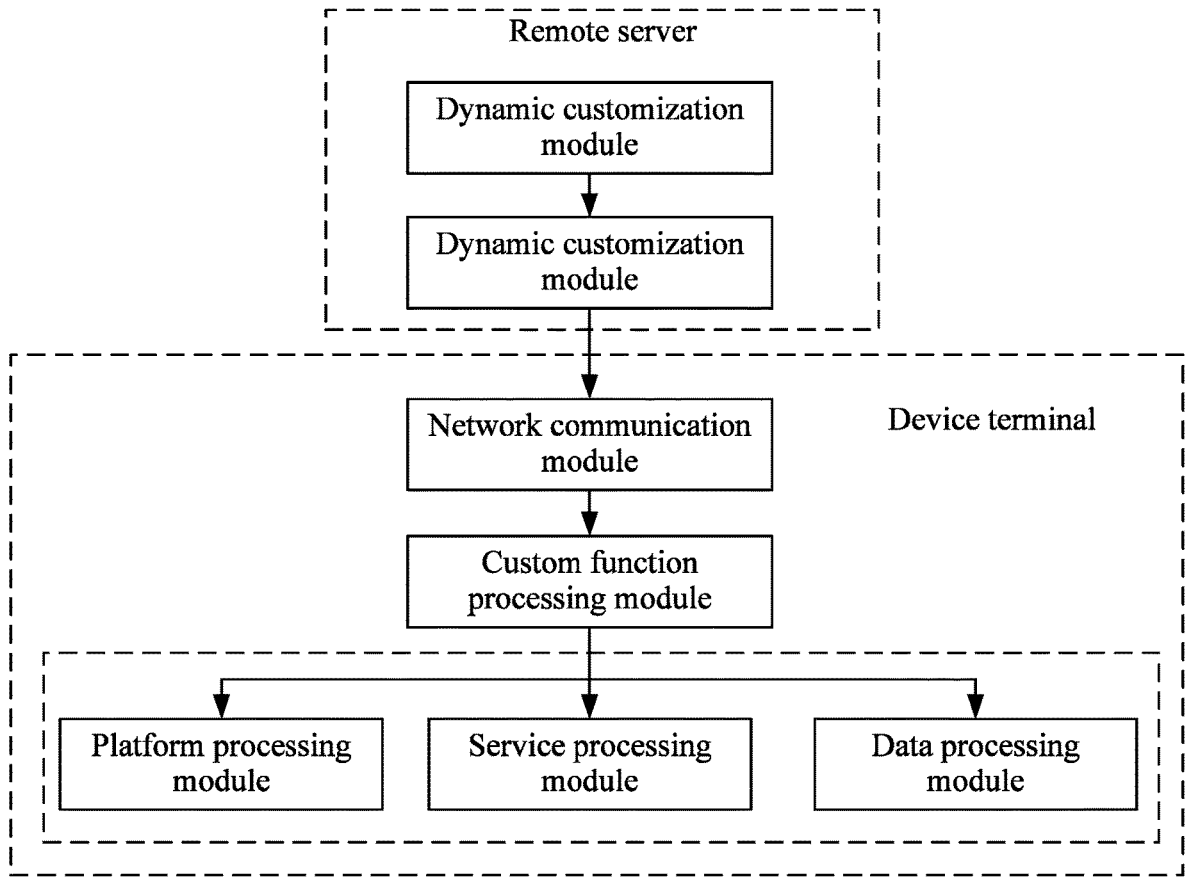
FIG. 10 is a diagram illustrating an example of an apparatus for remote customization of a function according to an embodiment of the present application.

FIG. 10 is a diagram illustrating an example of an apparatus for remote customization of a function according to an embodiment of the present application. Referring to FIG. 10, the methods provided in the embodiments of the present application are implemented based on a remote server and a device terminal. On a remote server side, a dynamic customization module parses a function A to be customized and decomposes the function A into N minimum basic functions which correspond to operation methods for N remote service functions of the device terminal. A remote management module communicates with the device terminal and calls the operation methods for the N remote service functions of the device terminal. On a device terminal side, a network communication module communicates and interacts with the remote server and receives the operation methods delivered by the remote server for the remote service functions. A custom function processing module processes operation commands for the N remote service functions and from the remote server. Firstly, a function framework A is created, which includes the N remote service functions. Then, corresponding service function APIs are called one by one to implement the N service functions. Finally, the implemented function A is stored in the device terminal so that the custom function A is implemented. A basic function factory includes all basic function APIs of the device terminal, such as adding an xxx function, setting a yyy function, and deleting a zzz function. The basic function factory is mainly composed of a service function processing module, a platform function processing module, and a data processing module. The service function processing module provides basic APIs for operations on service functions of the device terminal. The platform function processing module provides basic APIs for operations on platform functions of the terminal device. The data processing module provides basic APIs for operations on data of the terminal device.

Figure 11:
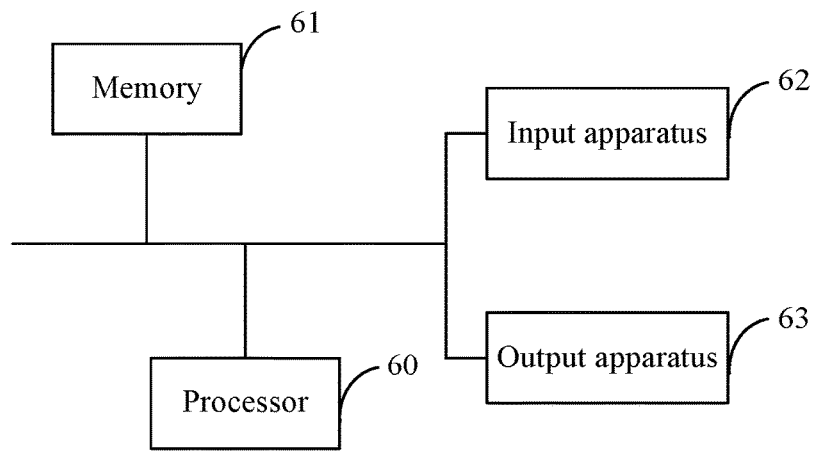
FIG. 11 is a structural diagram of a device according to an embodiment of the present application.

FIG. 11 is a structural diagram of a device according to an embodiment of the present application. As shown in FIG. 11, the device includes a processor 60, a memory 61, an input apparatus 62, and an output apparatus 63. One or more processors 60 may be provided in the device. One processor 60 is shown as an example in FIG. 11. The processor 60, the memory 61, the input apparatus 62, and the output apparatus 63 in the device may be connected via a bus or in other manners. The connection via a bus is shown as an example in FIG. 11.

As a computer-readable storage medium, the memory 61 may be configured to store software programs, computer-executable programs, and modules, such as modules (a function division module 410, an instruction determination module 420, and an instruction transmission module 430; or an instruction receiving module 510, a function seeking module 520, and a function construction module 530) corresponding to the apparatus for remote customization of a function in an embodiment of the present application. The processor 60 executes software programs, instructions, and modules stored in the memory 61 to perform function applications and data processing of the device, that is, to implement the preceding method.

The memory 61 may mainly include a program storage region and a data storage region. The program storage region may store an operating system and an application program required for at least one function, and the data storage region may store data or the like created according to the use of the terminal. Additionally, the memory 61 may include a high-speed random-access memory and may further include a non-volatile memory, for example, at least one magnetic disk memory, a flash memory, or another non-volatile solid-state memory. In some examples, the memory 61 may include memories which are remotely disposed relative to the processor 60, and these remote memories may be connected to the device via a network. Examples of the preceding network include, but are not limited to, the Internet, an intranet, a local area network, a mobile communication network, and a combination thereof.

The input apparatus 62 may be configured to receive inputted digital or character information and generate key signal input related to user settings and function control of the device. The output apparatus 63 may include a display device such as a display screen.

An embodiment of the present application further provides a computer-readable storage medium in which computer-executable instructions, when executed by a computer processor, are used for performing a remote function customization method. The method includes the following.

A custom function is determined according to a service requirement and the custom function is divided into at least one minimum function unit. A remote function operation instruction is determined for the minimum function unit. The remote function operation instruction is sent to a device terminal to cause the device terminal to implement the custom function.

Alternatively, a remote function operation instruction sent by a remote server is received. Basic functions are acquired from a pre-stored set of minimum function units according to the remote function operation instruction. A custom function is constructed according to the basic functions.

In the storage medium including computer-executable instructions provided by embodiments of the present application, the computer-executable instructions implement not only the preceding method operations but also related operations in the method for remote customization of a function provided in any embodiment of the present application.

The preceding are only example embodiments of the present application and not intended to limit the scope of the present application.

It is to be understood by those skilled in the art that the term user terminal encompasses any suitable type of wireless user device, for example, a mobile phone, a portable data processing apparatus, a portable web browser, or a vehicle-mounted mobile station.

Generally speaking, various embodiments of the present application may be implemented in hardware or special-purpose circuits, software, logic, or any combination thereof. For example, some aspects may be implemented in hardware while other aspects may be implemented in firmware or software executable by a controller, a microprocessor, or another computing apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, state setting data, or source codes or object codes written in any combination of one or more programming languages.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be of any type suitable for a local technical environment and may be implemented by using any suitable data storage technology, such as, but not limited to, a read-only memory (ROM), a random-access memory (RAM), and an optical memory apparatus and system (a digital video disc (DVD) or a compact disk (CD)). Computer-readable media may include non-transitory storage media. A data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FGPA), and a processor based on a multi-core processor architecture.

The detailed description of example embodiments of the present application has been provided above through exemplary and non-restrictive examples. However, considering the drawings and the claims, various modifications and adjustments to the preceding embodiments are apparent to those skilled in the art without deviating from the scope of the present application. Accordingly, the proper scope of the present disclosure is determined according to the claims.

What is claimed is:

1. A method for remote customization of a function, applied to a remote server, comprising:
    determining a custom function according to a service requirement and dividing the custom function into at least one minimum function unit;
    determining a remote function operation instruction for the at least one minimum function unit; and
    sending the remote function operation instruction to a device terminal to cause the device terminal to implement the custom function;
    wherein each of the at least one minimum function unit is implemented by a respective one of at least one basic function of the device terminal, and the remote function operation instruction is associated with the at least one basic function, and the remote function operation instruction and the at least one basic function are comprised in a pre-stored set of minimum function units in the device terminal.

2. The method of claim 1, wherein the dividing the custom function into the at least one minimum function unit comprises:
    determining at least one execution step of the custom function; and
    determining a minimum function unit corresponding to the at least one execution step based on the at least one execution step.

3. The method of claim 2, wherein sending the remote function operation instruction to the device terminal to cause the device terminal to implement the custom function comprises:
    acquiring a basic service interface corresponding to each of the at least one minimum function unit; and
    sending the remote function operation instruction to the device terminal through the basic service interface to cause the device terminal to implement the custom function.

4. The method of claim 1, wherein the remote function operation instruction comprises a calling instruction for the at least one minimum function unit.

5. A non-transitory computer-readable storage medium, which is configured to store a computer program, wherein the computer program, when executed by a processor, causes the processor to perform the method for remote customization of the function of claim 1.

6. A method for remote customization of a function, applied to a device terminal, comprising:
    receiving a remote function operation instruction sent by a remote server;
    acquiring at least one basic function from a pre-stored set of minimum function units in the device terminal according to the remote function operation instruction; and
    constructing a custom function according to the at least one basic function;
    wherein the remote function operation instruction is associated with the at least one basic function, and the remote function operation instruction and the at least one basic function are comprised in the pre-stored set of minimum function units in the device terminal.

7. The method of claim 6, wherein acquiring the at least one basic function from the pre-stored set of minimum function units according to the remote function operation instruction comprises:
    creating a function framework based on the remote function operation instruction; and
    acquiring the at least one basic function from the set of minimum function units in sequence according to an execution sequence of the function framework.

8. The method of claim 7, wherein constructing the custom function according to the at least one basic function comprises:
    filling the function framework corresponding to the remote function operation instruction with the at least one basic function to construct the custom function.

9. The method of claim 7, wherein the set of minimum function units comprises at least one of:
    a minimum service function unit, a minimum platform function unit, or a minimum data processing function unit.

10. A device, comprising:
    one or more processors; and
    a memory, which is configured to store one or more programs;
    wherein the one or more programs are executed by the one or more processors to cause the one or more processors to perform a method for remote customization of a function, wherein the method comprises:
    determining a custom function according to a service requirement and dividing the custom function into at least one minimum function unit;
    determining a remote function operation instruction for the at least one minimum function unit; and
    sending the remote function operation instruction to a device terminal to cause the device terminal to implement the custom function;
    wherein each of the at least one minimum function unit is implemented by a respective one of at least one basic function of the device terminal, and the remote function operation instruction is associated with the at least one basic function, and the remote function operation instruction and the at least one basic function are comprised in a pre-stored set of minimum function units in the device terminal.

11. The device of claim 10, wherein the dividing the custom function into the at least one minimum function unit comprises:
    determining at least one execution step of the custom function; and
    determining a minimum function unit corresponding to the at least one execution step based on the at least one execution step.

12. The device of claim 11, wherein sending the remote function operation instruction to the device terminal to cause the device terminal to implement the custom function comprises:

acquiring a basic service interface corresponding to each of the at least one minimum function unit; and sending the remote function operation instruction to the device terminal through the basic service interface to cause the device terminal to implement the custom function.

13. The device of claim 10, wherein the remote function operation instruction comprises a calling instruction for the at least one minimum function unit.

* * * * *